(12) United States Patent
Jafarnia Jahromi et al.

(10) Patent No.: US 11,550,063 B2
(45) Date of Patent: Jan. 10, 2023

(54) METHOD AND APPARATUS FOR SYNCHRONIZING WITH GLOBAL NAVIGATION SATELLITE SYSTEM

(71) Applicant: Samsung Electronics Co., Ltd., Gyeonggi-do (KR)

(72) Inventors: Ali Jafarnia Jahromi, San Jose, CA (US); Sundar Raman, Fremont, CA (US); Pravesh Asthana, Cedar Rapids, IA (US); William Higgins, Cedar Rapids, IA (US)

(73) Assignee: Samsung Electronics Co., Ltd

( * ) Notice: Subject to any disclaimer, the term of this patent is extended or adjusted under 35 U.S.C. 154(b) by 70 days.

(21) Appl. No.: 17/245,654

(22) Filed: Apr. 30, 2021

(65) Prior Publication Data

US 2022/0350034 A1 Nov. 3, 2022

(51) Int. Cl.
*G01S 19/24* (2010.01)
(52) U.S. Cl.
CPC .................. *G01S 19/24* (2013.01)
(58) Field of Classification Search
CPC ........... G01S 19/24; G01S 19/13; G01S 19/23
USPC .................................... 342/357.63
See application file for complete search history.

(56) References Cited

U.S. PATENT DOCUMENTS

| 7,924,220 | B1 | 4/2011 | Lennen et al. |
| 8,116,354 | B2 | 2/2012 | Chen |
| 9,322,926 | B2* | 4/2016 | Sagiraju .................. G01S 19/42 |
| 10,574,437 | B1 | 2/2020 | Ye et al. |
| 2020/0064490 | A1 | 2/2020 | Lennen |

FOREIGN PATENT DOCUMENTS

| CN | 103472467 | | 6/2015 | |
| CN | 109375242 A | * | 2/2019 | ............. G01S 19/24 |
| CN | 111487655 | | 8/2020 | |
| CN | 107656300 B | * | 10/2020 | ............. G01S 19/33 |
| CN | 114567712 A | * | 5/2022 | |
| WO | WO-2018107441 A1 | * | 6/2018 | ............. G01S 19/24 |

* cited by examiner

*Primary Examiner* — Harry K Liu
(74) *Attorney, Agent, or Firm* — The Farrell Law Firm, P.C.

(57) ABSTRACT

A receiver and method thereof are provided for synchronizing with a global navigation satellite system (GNSS) including a plurality of satellite vehicles (SVs). The method includes starting a verification process and a bitsync (BS) process in parallel with a first SV among the plurality of SVs, and upon completing the verification process while still performing the BS process, starting a track channel process with the first SV based on an interim BS result obtained at the time of completing the verification process, and starting a frame sync (FS) process with first SV based on the interim BS result. An aligned acquisition (AA) process may be started with a second SV among the plurality of SVs, upon completing the verification process, based on the interim BS result.

20 Claims, 7 Drawing Sheets

METHOD AND APPARATUS FOR SYNCHRONIZING WITH GLOBAL NAVIGATION SATELLITE SYSTEM

FIELD

The present disclosure relates generally to a method and system for synchronizing with a global navigation satellite system (GNSS) including a plurality of satellite vehicles (SVs), and more particularly, to a satellite positioning receiver and method thereof, which perform frame sync (FS) and aligned acquisition (AA) before completing bit sync (BS) with an SV.

BACKGROUND

BS, FS, and AA are some of the processes that a satellite positioning receiver or a GNSS receiver (hereinafter, "receiver") performs in order to synchronize to a reference time of a GNSS constellation and to extract satellite ephemeris and almanac information for positioning and navigation. In weak signal scenarios, a conventional receiver first attempts to extract bit transition boundaries and thereafter, using that extracted information, extend the coherent integration time within the bit boundary to improve received signal to noise ratio (SNR) before starting to look for a sub-frame boundary and perform AA process. Conventionally, the receiver performs a BS process first to identify a bit boundary and then starts FS and AA processes once the bit boundary is known.

SUMMARY

An aspect of the present disclosure is to provide a receiver and method thereof, which perform track channel and FS processes while a BS process is ongoing, using an interim BS result that is available at the time of signal validation, instead of waiting until the BS process is successfully completed.

Another aspect of the present disclosure is to provide a receiver and method thereof, which also perform AA processes while a BS process is ongoing, using an interim BS result that is available at the time of signal validation, instead of waiting until the BS process is successfully completed.

In accordance with an aspect of the disclosure, a method is provided for a receiver to synchronize with a GNSS including a plurality of SVs. The method includes starting a verification process and a BS process in parallel with a first SV among the plurality of SVs; and upon completing the verification process while still performing the BS process, starting a track channel process with the first SV based on an interim BS result obtained at the time of completing the verification process, and starting an FS process with first SV based on the interim BS result.

In accordance with another aspect of the disclosure, a receiver is provided that synchronizes with a GNSS including a plurality of SVs. The receiver includes a GNSS antenna configured to receive SV signals, and a processor configured to start a verification process and a BS process in parallel with a first SV among the plurality of SVs, and upon completing the verification process while still performing the BS process, start a track channel process with the first SV based on an interim BS result obtained at the time of completing the verification process, and start an FS process with first SV based on the interim BS result.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
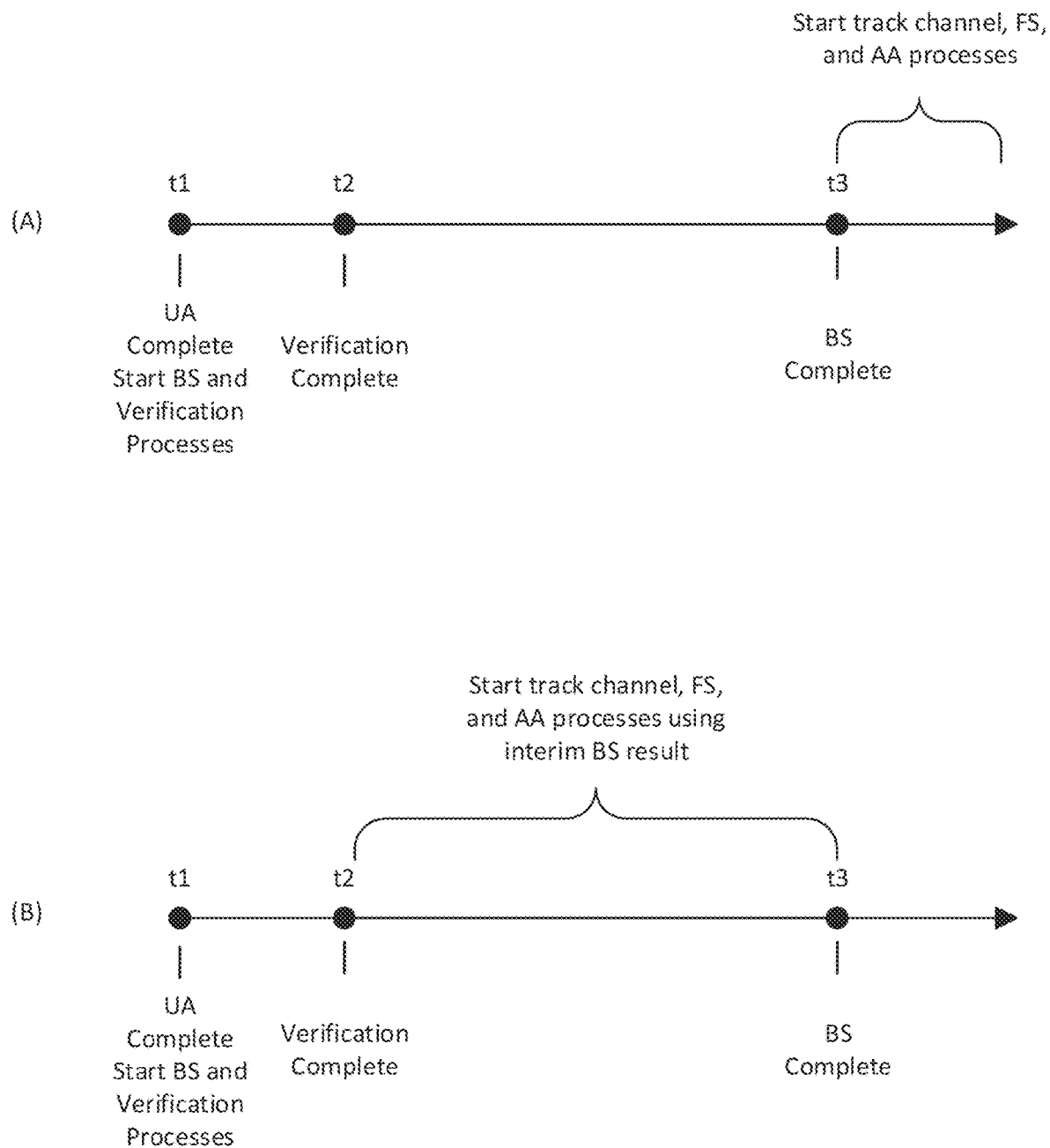
FIG. 1 is a diagram of time lines illustrating a comparison between a conventional receiver synchronization method and a receiver synchronization method according to an embodiment.

Hereinafter, various embodiments of the disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc., may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

An electronic device, such a receiver with global positioning system (GPS) functionality, according to an embodiment may be one of various types of electronic devices. The electronic devices may include, for example, a portable communication device (e.g., a smart phone), a computer, a portable multimedia device, a portable medical device, a camera, a wearable device, or a home appliance. According to an embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "1$^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, a module may be implemented in a form of an application-specific integrated circuit (ASIC).

As described above, a conventional synchronization method using weak signals from an SV generally includes an acquisition step, which is typically unaligned, where bit boundaries are not known due to large time uncertainties, followed by parallel BS and verification processes.

During the BS process, the receiver looks for data bit transition boundaries to make a longer coherent integration possible. During the verification process the receiver repeats the acquisition on a smaller uncertainty window, thereby verifying the acquisition of the SV.

While the BS and verification processes are usually started in parallel, the verification process normally succeeds before BS success (BSS), i.e., before a final BS result is determined. For example, in a conventional receiver, the time to complete the BS process is typically 2-5 seconds for weak signal scenarios (~20 dBHz). The BS time is a function of signal strength and number of bit transitions. However, the time to complete the verification process is typically less than 2 seconds, even for weak signals.

In a conventional receiver, the BS process precedes Track channel/FS/AA processes since conventional FS and AA processes assume that the bit boundaries need to be known exactly.

Normally, the track channel process starts on 20 ms coherent integration aligned with bit transition boundaries found from the BS process. The FS process, which is used to establish the frame boundary in order to set the system time, usually takes anywhere from few hundreds of ms to 6 seconds for GPS signals. This is also a function of signal strength and the search start time with respect to frame boundary (uniform random distribution).

The AA process is used to acquire SVs based on reduced time uncertainty using 20 ms integration times, using the knowledge of bit boundaries extracted from the BS process. The successful AA process completion time is a function of signal strength and it is also a function of desired false alarm probability.

Once a sufficient number of SVs are available, the receiver can achieve the first position fix (i.e., time to first fix (TTFF)). Having more SVs with good measurements will improve the quality of the fix, which is normally measured by circular error probability (CEP).

Using the conventional procedure described above, because receiver does not utilize the track channel/FS/AA processes until the BS process is complete, the total processing time (that of the BS process followed by track channel/FS/AA process completion times), delays the TTFF considerably. That is, the TTFF will be at least as large as the addition of these individual times (i.e., BS Time+track channel/FS/AA time). Other processes, such as unaligned acquisition will also play a role in TTFF.

In accordance with an embodiment of the present disclosure, because the verification process is normally faster than the BS process, and an interim BS result is normally available at the completion of the verification process, rather than wait until the completion of the BS process, a receiver may start track channel/FS/AA process using the interim BS result, which is generally within ±2 ms of the correct bit boundary.

More specifically, a receiver according to an embodiment of the disclosure takes advantage of the interim BS result by starting a track channel process based on the interim BS result, starting FS based on the interim BS result, and starting an AA process based on the interim BS result, upon completion of the verification process, while the BS process is still ongoing. Since the interim BS result (reached at the verification time) takes only ~2 seconds, while the final BS result may take up to ~5 s, the receiver according to an embodiment is able to speeds up the TTFF considerably.

By starting the AA process immediately upon completing the verification process, this also allows for longer dwell time for the AA process, which subsequently improves a receiver's sensitivity.

By starting the FS process immediately upon completing the verification process, this process also allows for the possibility that FS process completes earlier.

As will be described in more detail below, using this interim BS result would not cause any significant degradation in either FS or AA.

Essentially, the above-described embodiment modifies a receiver's operation sequence to use an interim BS result, without changing an existing bit synchronization method.

FIG. 1 is a diagram of time lines illustrating a comparison between a conventional receiver synchronization method and a receiver synchronization method according to an embodiment.

Referring to FIG. 1, timeline A, which corresponds to a conventional receiver synchronization method, at time t1, a receiver completes unaligned acquisition (UA) with an SV and starts the verification and BS processes in parallel.

At time t2, the verification process is complete, but the BS processes continues until time t3. Not until successfully completing the BS processes at time t3 does the receiver begin to utilize a final BS result to perform the Track channel/FS/AA processes.

However, as illustrated in timeline B, which corresponds to a receiver synchronization method according to an embodiment of the disclosure, at time t1, a receiver similarly completes UA with an SV and starts the verification and BS processes in parallel.

At time t2, the verification process is also complete, but unlike the receiver in timeline A, the receiver obtains an interim BS result at or shortly after time t2, and then begins performing the Track channel/FS/AA processes based on the interim BS result, while the BS processes continues until time t3.

Therefore, by starting the Track channel/FS/AA processes much earlier in timeline B than in timeline A, a receiver may considerably improve the TTFF and increase the sensitivity of the AA processes.

Figure 2:
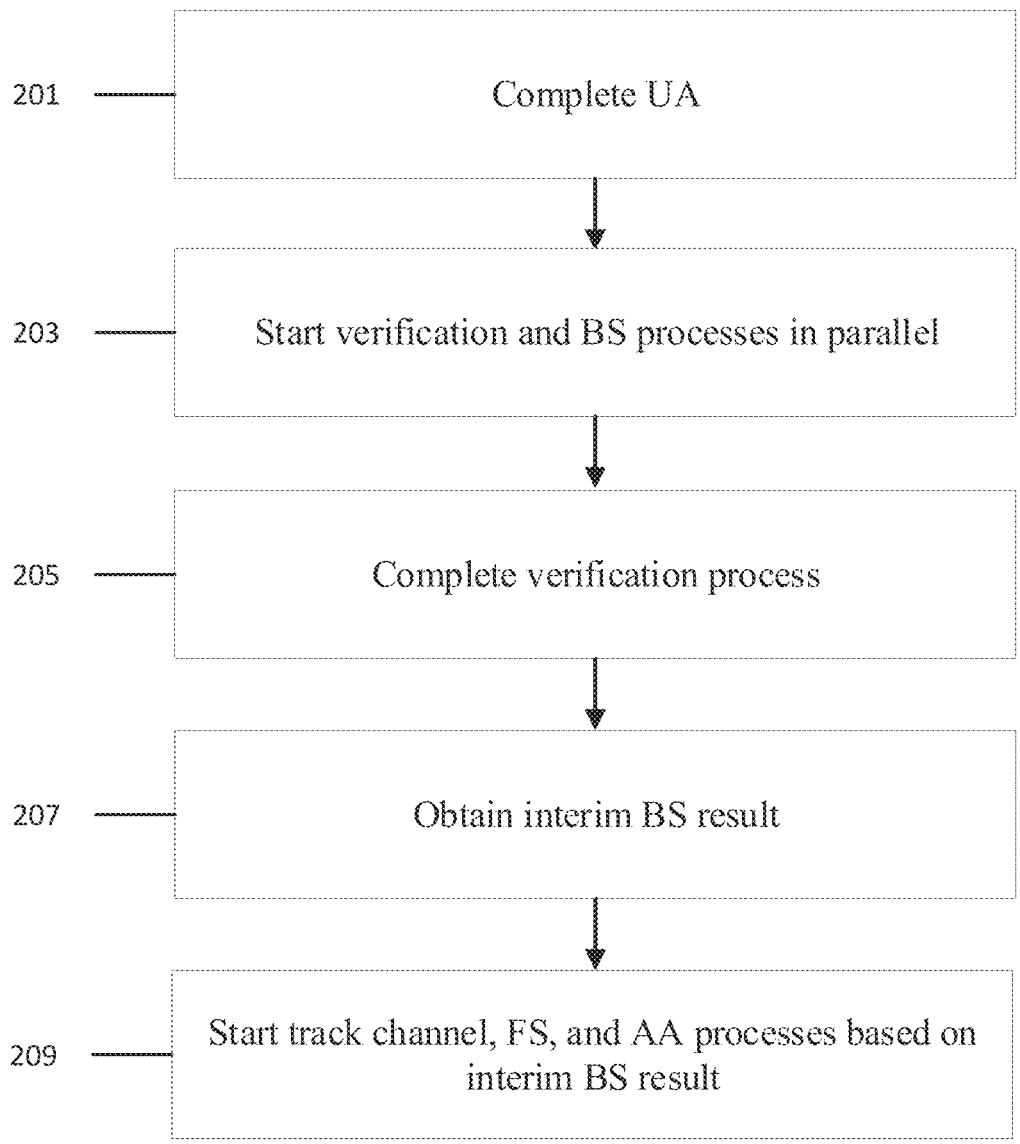
FIG. 2 is a flowchart illustrating a method of a receiver for synchronizing with a GNSS including a plurality of SVs, according to embodiment.

FIG. 2 is a flowchart illustrating a method of a receiver for synchronizing with a GNSS including a plurality of SVs, according to embodiment.

Referring to FIG. 2, in step 201, the receiver completes UA of a first SV.

In step 203, the receiver starts verification and BS processes, in parallel, for the first SV.

In step 205, the receiver successfully completes the verification process, although the BS process continues.

In step 207, the receiver obtains an interim BS result. The interim BS result is generally obtained at or near to the same time as completion of the verification process.

More specifically, the BS process is an ongoing process that continuously tests multiple millisecond hypotheses to determine a correct millisecond edge. At the time the verification is complete, the most likely hypothesis may be used as the interim BS.

In step 209, the receiver starts track channel and FS processes with first SV based on the interim BS result. The receiver also starts aligned AA processes with at least one other SV among the plurality of SVs, based on the interim BS result. The received may also update a system time based on the interim BS result.

As described above, a receiver according to an embodiment of the disclosure starts FS sync and AA processes based on an interim bit sync result, after signal verification is complete, before BS is completed.

Figure 3:
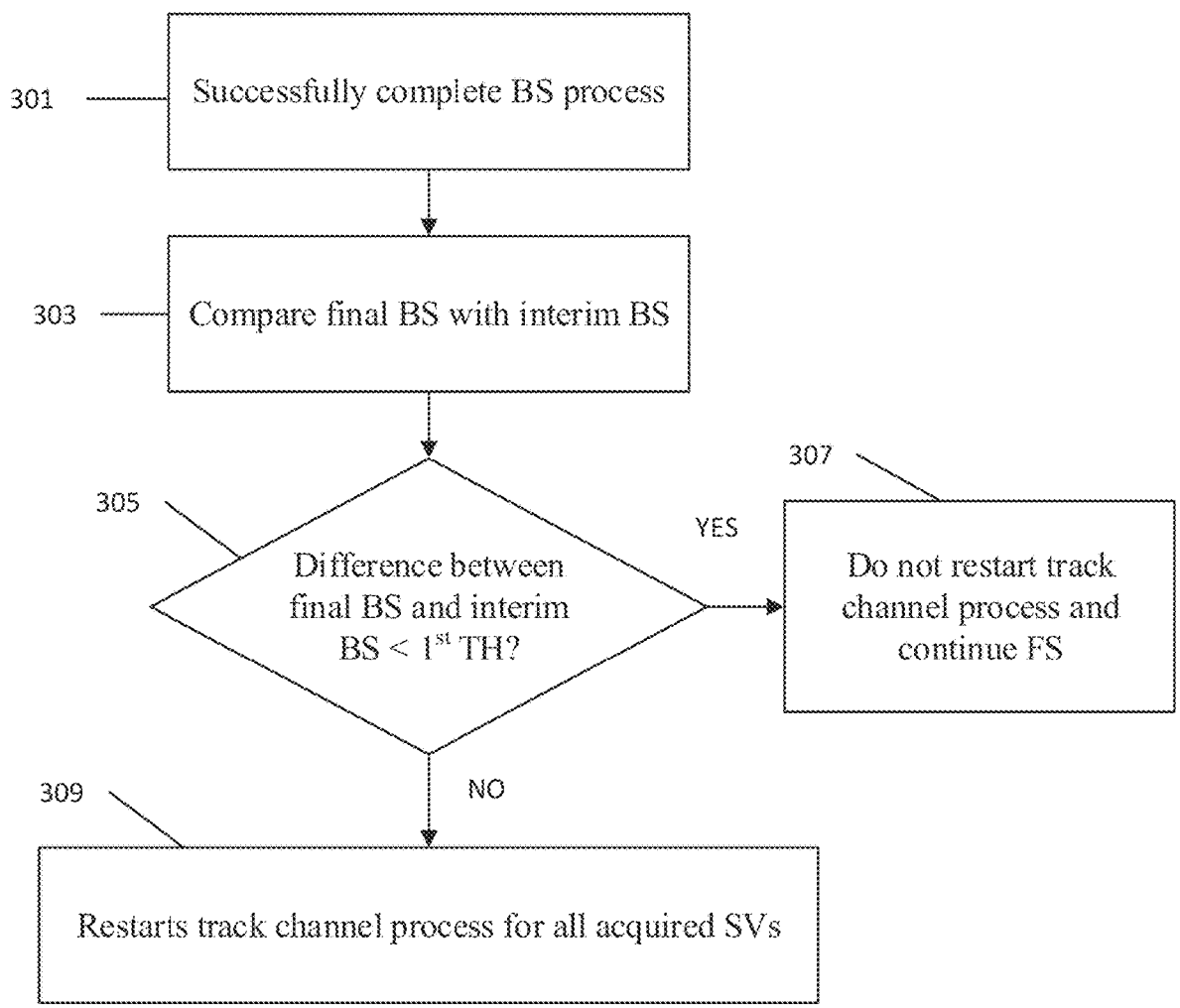
FIG. 3 is a flowchart illustrating a method of a receiver upon successful completion of a BS process, according to embodiment.

FIG. 3 is a flowchart illustrating a method of a receiver upon successful completion of a BS process, according to embodiment.

Referring to FIG. 3, in step 301, the receiver successfully completes a BS process, e.g., the BS process started in step 203 of FIG. 2.

In step 303, the receiver compares a final BS result with the interim BS result, e.g., obtained in step 207 of FIG. 2. When comparing the interim BS to the final BS, it is assumed that all appropriate propagations are taken into account, considering the time difference between which these two events occurred.

In step 305, the receiver determines if a difference between the final BS result and the interim BS result is within a first threshold (e.g., 2 ms).

If the receiver determines that the difference between the final BS result and the interim BS result is within the first threshold, the track channel process does not restart and the FS processes continue with existing FS buffer content in step 307.

However, if the receiver determines that the difference between the final BS result and the interim BS result is not within the first threshold, the receiver restarts the track channel process for all acquired SVs based on the final BS result in step 309.

If the FS process is successfully completed before BS process is completed, the receiver uses that FS result. Therefore, even if the track channel process needs to restart due to a BS mismatch in step 309, the FS result is already known and the receiver does not need to start a new FS process.

If an AA process is successfully completed before the BS process is completed, the receiver uses the AA result to start a track channel on an acquired SV. If a BS mismatch is later detected in step 305, the track channel process for the acquired SVs (i.e., the SVs acquired through AA processes that were completed before completing the BS process) will be restarted in step 309.

Figure 4:
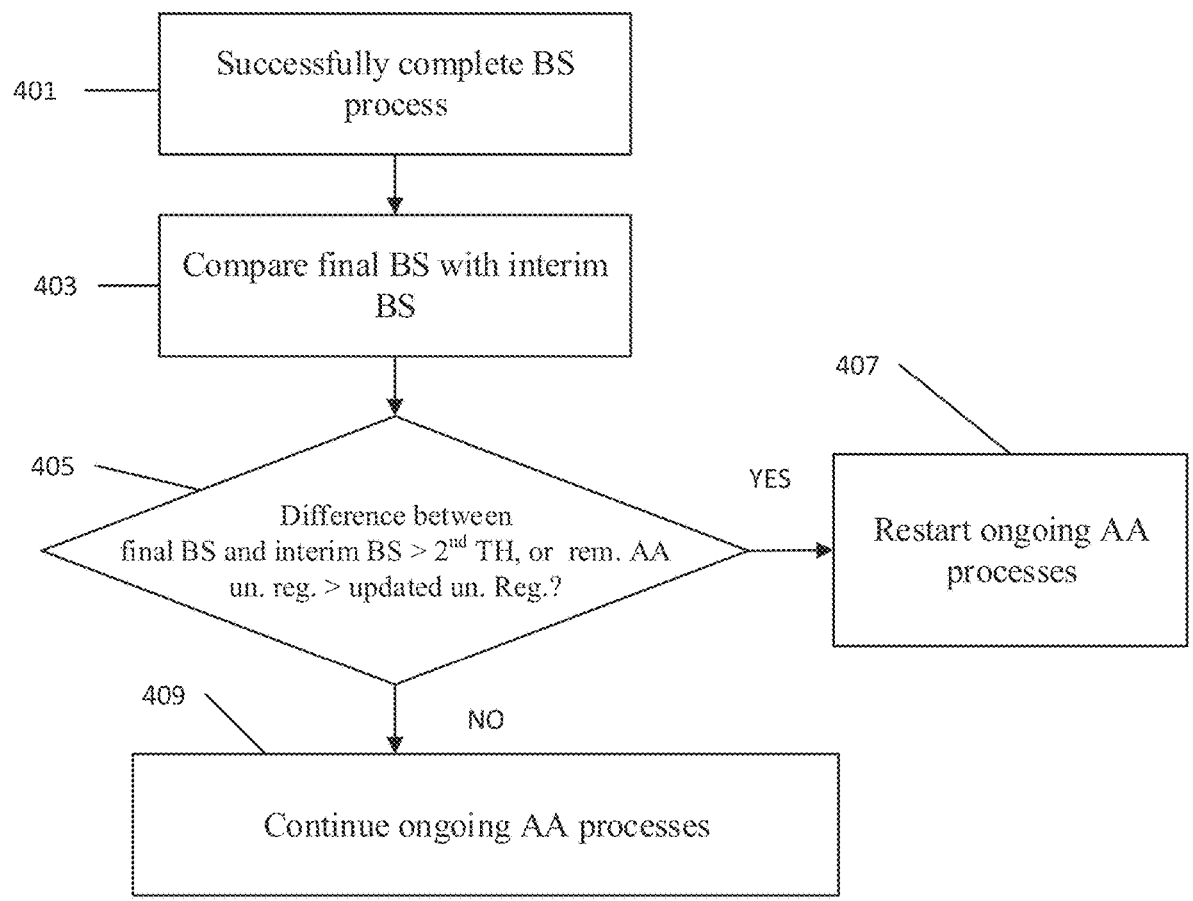
FIG. 4 is a flowchart illustrating a method of a receiver performing an AA process upon successful completion of a BS process, according to embodiment.

FIG. 4 is a flowchart illustrating a method of a receiver performing an AA process upon successful completion of a BS process, according to embodiment.

Referring to FIG. 4, in step 401, the receiver successfully completes a BS process, e.g., the BS process started in step 203 of FIG. 2.

In step 403, the receiver compares a final BS result with the interim BS result, e.g., obtained in step 207 of FIG. 2. When comparing the interim BS to the final BS, it is assumed that all appropriate propagations are taken into account, considering the time difference between which these two events occurred.

Although FIG. 4 illustrates the receiver successfully completes the BS process and comparing the interim BS to the final BS in steps 401 and 403 in the same way as performed in steps 301 and 303 of FIG. 3, because the methods of FIGS. 3 and 4 may be performed in parallel, in reality, the receiver may actually successfully complete the BS process and compare the interim BS to the final BS just one time, and then use comparison result in both of steps 305 and 405.

In step 405, the receiver determines whether the difference between the final BS result and the interim BS result is greater than a second threshold (e.g., 2 seconds) or whether a remaining AA uncertainty region to be searched is larger than an updated AA uncertainty region after successfully completing the BS process. Generally, the order of the BS error is within 0 to ±10 milliseconds.

Although FIG. 4 provides an example of the second threshold, which is greater than the example first threshold provided in FIG. 3, this relationship between the thresholds may vary depending on system requirements. For example, the first threshold may be greater than the second threshold or the first threshold and the second threshold may be the same.

If the receiver determines that the difference between the final BS result and the interim BS result is greater than the second threshold or that the remaining AA uncertainty region is larger than the updated uncertainty region in step 405, the receiver restarts any ongoing AA processes in step 407.

However, if the receiver determines that neither the difference between the final BS result and the interim BS result is greater than the second threshold nor the remaining AA uncertainty region is larger than the updated AA uncertainty region in step 405, the receiver continues the ongoing AA processes in step 409.

Using the methods described in FIGS. 2, 3, and 4, the receiver starts the FS and AA processes based on the interim BS result, immediately after signal verification is complete. As will be described below, simulations and real data processing results show that interim BS results are in agreement with final BS result in a majority of cases. Further, even if there is a difference between these two BS results, it is not more than a couple of milliseconds, which only causes a slight degradation in SNR performance of frame sync and aligned acquisition process. As a result, the above-described methods speed up the FS/AA processes up to several seconds and improves TTFF and mobile station assisted (MSA) coarse time assisted (CTA) sensitivity performance.

Figure 5:
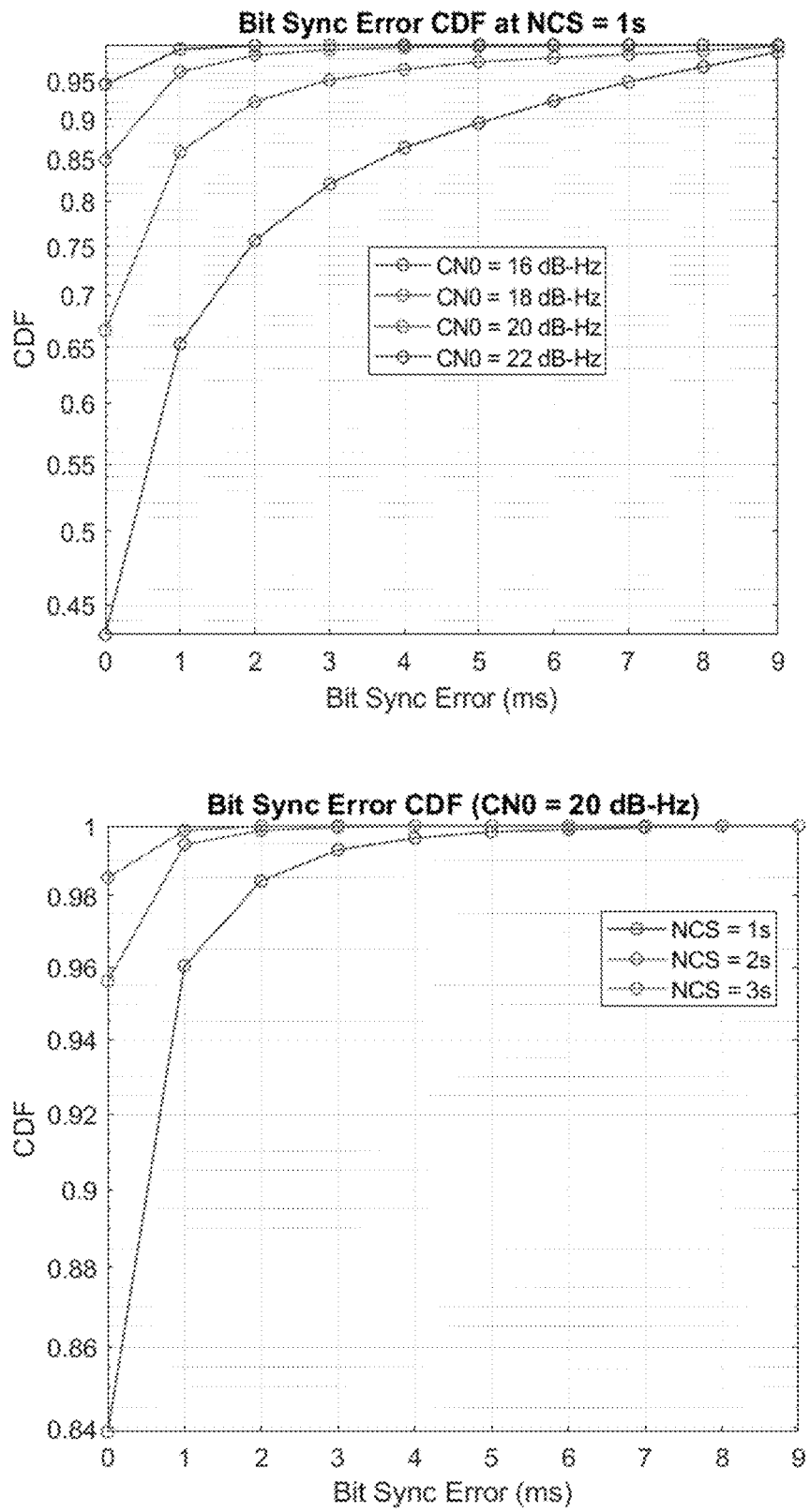
FIG. 5 illustrates simulation results regarding BS error, according to embodiment.

FIG. 5 illustrates simulation results regarding BS error, according to embodiment.

As illustrated in FIG. 5, the interim BS is in general within ±2 ms from the correct bit boundary.

Figure 6:
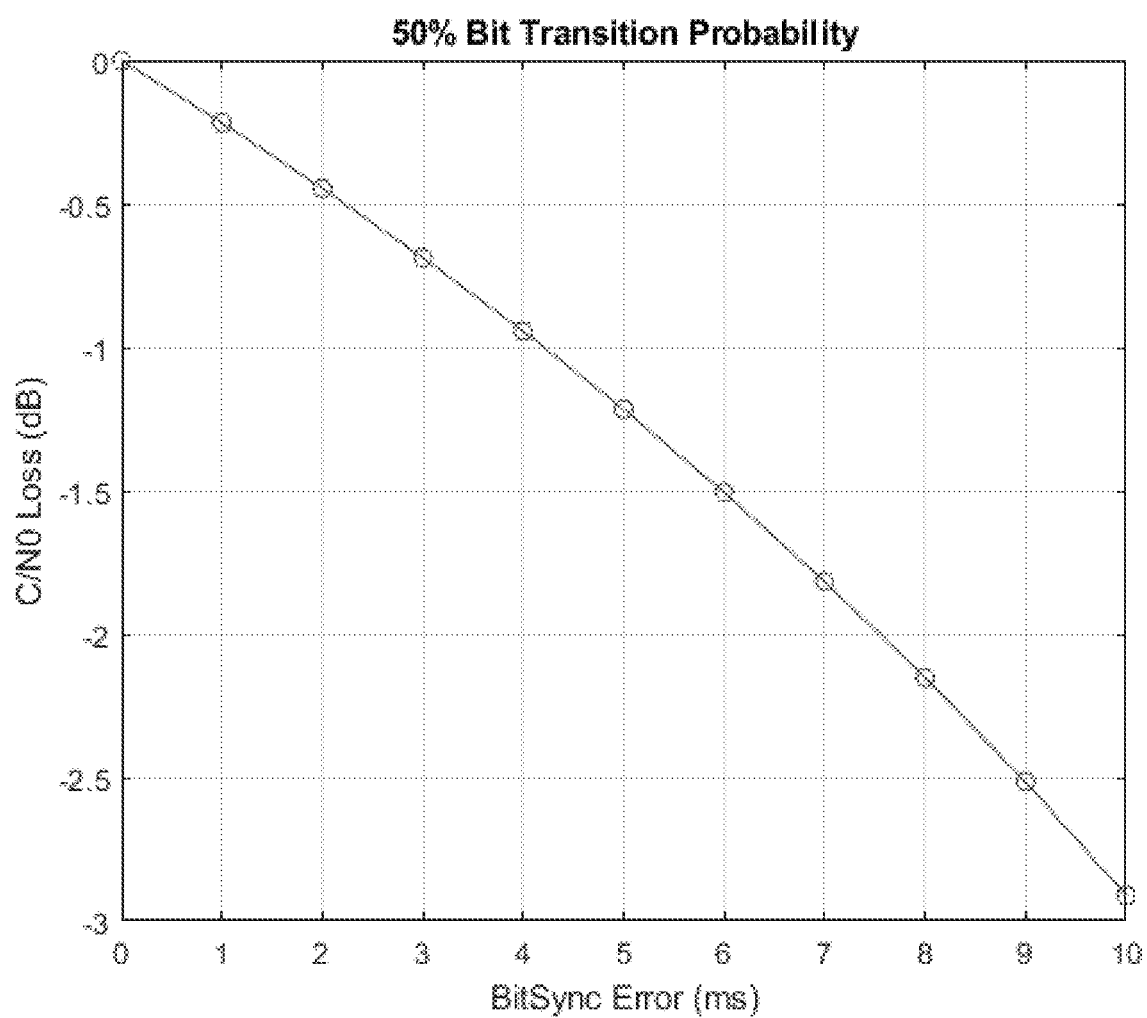
FIG. 6 illustrates simulation results regarding CN0 loss versus BS error, according to embodiment.

FIG. 6 illustrates simulation results regarding CN0 loss versus BS error, according to embodiment.

As illustrated in FIG. 6, a 2 ms in BS error causes less than 0.5 dB loss in CN0, assuming a 50% bit transition probability. Therefore, using an interim BS result does not create a significant performance degradation on FS and AA processes.

Figure 7:
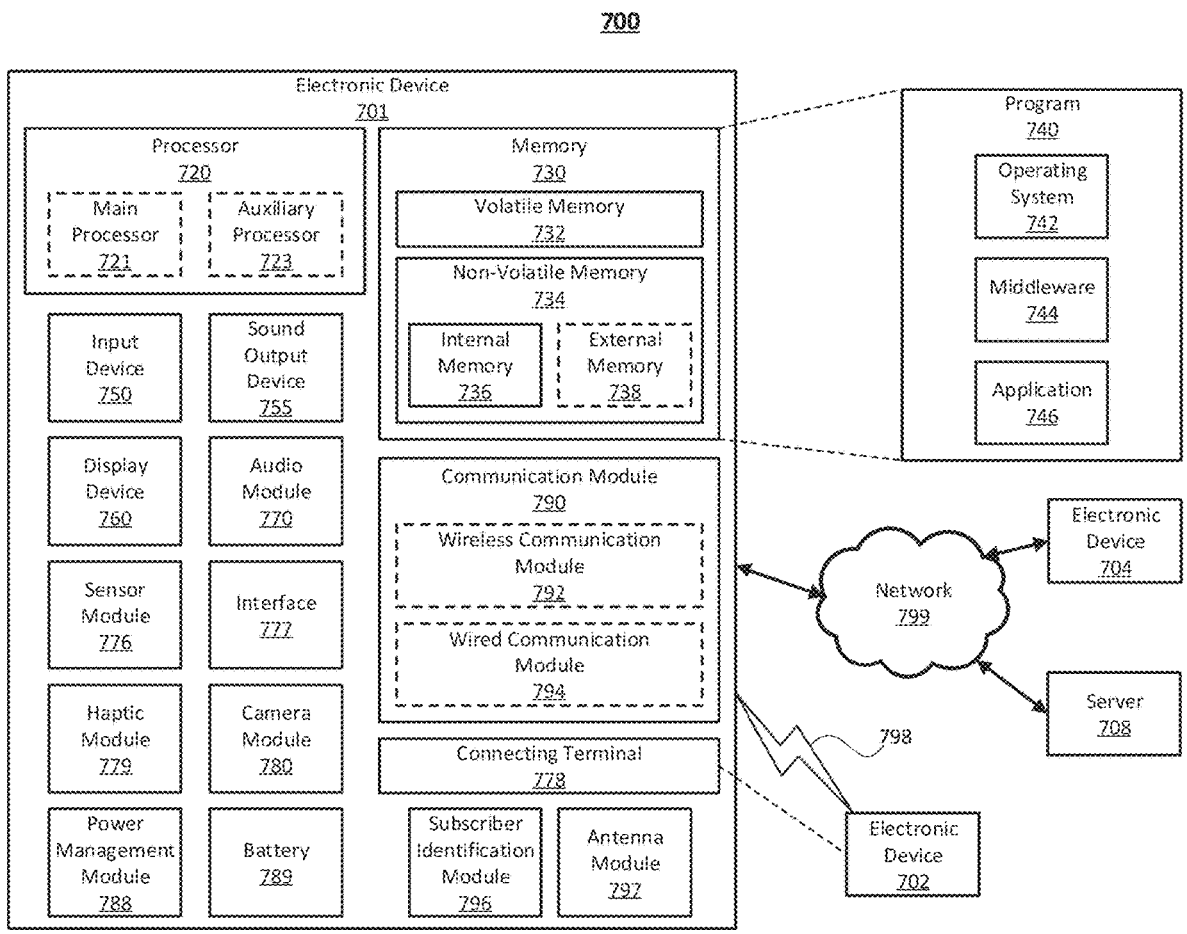
FIG. 7 illustrates an electronic device in a network environment, according to an embodiment.

FIG. 7 illustrates an electronic device in a network environment, according to an embodiment.

Referring to FIG. 7, the electronic device 701, e.g., a mobile terminal including GPS functionality, in the network environment 700 may communicate with an electronic device 702 via a first network 798 (e.g., a short-range wireless communication network), or an electronic device 704 or a server 708 via a second network 799 (e.g., a long-range wireless communication network). The electronic device 701 may communicate with the electronic device 704 via the server 708. The electronic device 701 may include a processor 720, a memory 730, an input device 750, a sound output device 755, a display device 760, an audio module 770, a sensor module 776, an interface 777, a haptic module 779, a camera module 780, a power management module 788, a battery 789, a communication module 790, a subscriber identification module (SIM) 796, or an antenna module 797 including a GNSS antenna. In one embodiment, at least one (e.g., the display device 760 or the camera module 780) of the components may be omitted from the electronic device 701, or one or more other components may be added to the electronic device 701. In one embodiment, some of the components may be implemented as a single integrated circuit (IC). For example, the sensor module 776 (e.g., a fingerprint sensor, an iris sensor, or an illuminance sensor) may be embedded in the display device 760 (e.g., a display).

The processor 720 may execute, for example, software (e.g., a program 740) to control at least one other component (e.g., a hardware or a software component) of the electronic device 701 coupled with the processor 720, and may perform various data processing or computations. As at least part of the data processing or computations, the processor 720 may load a command or data received from another component (e.g., the sensor module 776 or the communication module 790) in volatile memory 732, process the command or the data stored in the volatile memory 732, and store resulting data in non-volatile memory 734. The processor 720 may include a main processor 721 (e.g., a central processing unit (CPU) or an application processor (AP)), and an auxiliary processor 723 (e.g., a graphics processing unit (GPU), an image signal processor (ISP), a sensor hub processor, or a communication processor (CP)) that is operable independently from, or in conjunction with, the main processor 721. Additionally or alternatively, the auxiliary processor 723 may be adapted to consume less power than the main processor 721, or execute a particular function. The auxiliary processor 723 may be implemented as being separate from, or a part of, the main processor 721.

The auxiliary processor 723 may control at least some of the functions or states related to at least one component (e.g., the display device 760, the sensor module 776, or the communication module 790) among the components of the electronic device 701, instead of the main processor 721 while the main processor 721 is in an inactive (e.g., sleep) state, or together with the main processor 721 while the main processor 721 is in an active state (e.g., executing an application). According to one embodiment, the auxiliary processor 723 (e.g., an image signal processor or a communication processor) may be implemented as part of another component (e.g., the camera module 780 or the communication module 790) functionally related to the auxiliary processor 723.

The memory 730 may store various data used by at least one component (e.g., the processor 720 or the sensor module 776) of the electronic device 701. The various data may include, for example, software (e.g., the program 740) and input data or output data for a command related thereto. The memory 730 may include the volatile memory 732 or the non-volatile memory 734.

The program 740 may be stored in the memory 730 as software, and may include, for example, an operating system (OS) 742, middleware 744, or an application 746.

The input device 750 may receive a command or data to be used by other component (e.g., the processor 720) of the electronic device 701, from the outside (e.g., a user) of the electronic device 701. The input device 750 may include, for example, a microphone, a mouse, or a keyboard.

The sound output device 755 may output sound signals to the outside of the electronic device 701. The sound output device 755 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 760 may visually provide information to the outside (e.g., a user) of the electronic device 701. The display device 760 may include, for example, a display, a hologram device, or a projector and control circuitry to control a corresponding one of the display, hologram device, and projector. According to one embodiment, the display device 760 may include touch circuitry adapted to detect a touch, or sensor circuitry (e.g., a pressure sensor) adapted to measure the intensity of force incurred by the touch.

The audio module 770 may convert a sound into an electrical signal and vice versa. According to one embodiment, the audio module 770 may obtain the sound via the input device 750, or output the sound via the sound output device 755 or a headphone of an external electronic device 702 directly (e.g., wiredly) or wirelessly coupled with the electronic device 701.

The sensor module 776 may detect an operational state (e.g., power or temperature) of the electronic device 701 or an environmental state (e.g., a state of a user) external to the electronic device 701, and then generate an electrical signal or data value corresponding to the detected state. The sensor module 776 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 777 may support one or more specified protocols to be used for the electronic device 701 to be coupled with the external electronic device 702 directly (e.g., wiredly) or wirelessly. According to one embodiment, the interface 777 may include, for example, a high definition multimedia interface (HDMI), a universal serial bus (USB) interface, a secure digital (SD) card interface, or an audio interface.

A connecting terminal 778 may include a connector via which the electronic device 701 may be physically connected with the external electronic device 702. According to one embodiment, the connecting terminal 778 may include, for example, an HDMI connector, a USB connector, an SD card connector, or an audio connector (e.g., a headphone connector).

The haptic module 779 may convert an electrical signal into a mechanical stimulus (e.g., a vibration or a movement) or an electrical stimulus which may be recognized by a user via tactile sensation or kinesthetic sensation. According to one embodiment, the haptic module 779 may include, for example, a motor, a piezoelectric element, or an electrical stimulator.

The camera module 780 may capture a still image or moving images. According to one embodiment, the camera module 780 may include one or more lenses, image sensors, image signal processors, or flashes.

The power management module 788 may manage power supplied to the electronic device 701. The power management module 788 may be implemented as at least part of, for example, a power management integrated circuit (PMIC).

The battery 789 may supply power to at least one component of the electronic device 701. According to one embodiment, the battery 789 may include, for example, a primary cell which is not rechargeable, a secondary cell which is rechargeable, or a fuel cell.

The communication module 790 may support establishing a direct (e.g., wired) communication channel or a wireless communication channel between the electronic device 701 and the external electronic device (e.g., the electronic device 702, the electronic device 704, or the server 708) and performing communication via the established communication channel. The communication module 790 may include one or more communication processors that are operable independently from the processor 720 (e.g., the AP) and supports a direct (e.g., wired) communication or a wireless communication. According to one embodiment, the communication module 790 may include a wireless communication module 792 (e.g., a cellular communication module, a short-range wireless communication module, or a global navigation satellite system (GNSS) communication module) or a wired communication module 794 (e.g., a local area network (LAN) communication module or a power line communication (PLC) module). A corresponding one of these communication modules may communicate with the external electronic device via the first network 798 (e.g., a short-range communication network, such as Bluetooth™, wireless-fidelity (Wi-Fi) direct, or a standard of the Infrared Data Association (IrDA)) or the second network 799 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 792 may identify and authenticate the electronic device 701 in a communication network, such as the first network 798 or the second network 799, using subscriber information (e.g., international mobile subscriber identity (IMSI)) stored in the subscriber identification module 796.

The antenna module 797 may transmit or receive a signal or power to or from the outside (e.g., the external electronic device) of the electronic device 701. According to one embodiment, the antenna module 797 may include one or more antennas, and, therefrom, at least one antenna appropriate for a communication scheme used in the communication network, such as the first network 798 or the second network 799, may be selected, for example, by the communication module 790 (e.g., the wireless communication module 792). The signal or the power may then be transmitted or received between the communication module 790 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 701 and the external electronic device 704 via the server 708 coupled with the second network 799. Each of the electronic devices 702 and 704 may be a device of a same type as, or a different type, from the electronic device 701. All or some of operations to be executed at the electronic device 701 may be executed at one or more of the external electronic devices 702, 704, or 708. For example, if the electronic device 701 should perform a function or a service automatically, or in response to a request from a user or another device, the electronic device 701, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 701. The electronic device 701 may provide the outcome, with or without further processing of the outcome, as at least part of a reply to the request. To that end, a cloud computing, distributed computing, or client-server computing technology may be used, for example.

One embodiment may be implemented as software (e.g., the program 740) including one or more instructions that are stored in a storage medium (e.g., internal memory 736 or external memory 738) that is readable by a machine (e.g., the electronic device 701). For example, a processor of the electronic device 701 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

As described above, according to an embodiment of the disclosure, a receiver runs FS and AA processes in parallel with BS processes using an interim BS result that is achieved by signal verification time.

If the FS result is not ready by the time that BS process successfully finishes, a final BS result will be cross checked with the interim BS result that was used at the start of track channel. If these two results are in agreement, current track channel does not restart and the ongoing FS and AA processes continue.

In view of foregoing, the receiver can perform a faster synchronization process that may improve TTFF performance as well as MSA CTA sensitivity performance.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method of a receiver for synchronizing with a global navigation satellite system (GNSS) including a plurality of satellite vehicles (SVs), the method comprising:
   starting a verification process and a bitsync (BS) process in parallel with a first SV among the plurality of SVs; and
   upon completing the verification process while still performing the BS process, starting a track channel process with the first SV based on an interim BS result obtained at the time of completing the verification process, and starting a frame sync (FS) process with first SV based on the interim BS result.

2. The method of claim 1, further comprising starting an aligned acquisition (AA) process with a second SV among the plurality of SVs, upon completing the verification process, based on the interim BS result.

3. The method of claim 2, further comprising updating a system time based on the interim BS result.

4. The method of claim 2, further comprising:
   upon successfully completing the BS process, comparing a final BS value with the interim BS value; and
   in response to a difference between the final BS value and the interim BS value being within a first threshold, the track channel process does not restart and the FS process continues with existing FS buffer content.

5. The method of claim 2, further comprising:
   upon successfully completing the BS process, comparing a final BS value with the interim BS value; and
   in response to a difference between the final BS value and the interim BS value not being within a first threshold, restarting the track channel process based on the final BS result.

6. The method of claim 2, further comprising:
   upon successfully completing the BS process, comparing a final BS value with the interim BS value; and
   in response to a difference between the final BS value and the interim BS value being greater than a second threshold or a remaining AA uncertainty region to be searched being larger than an updated AA uncertainty region after successfully completing the BS process, restarting any ongoing AA processes.

7. The method of claim 2, further comprising:
   upon successfully completing the BS process, comparing a final BS value with the interim BS value; and
   in response to a difference between the final BS value and the interim BS value not being greater than a second threshold or a remaining AA uncertainty region to be searched not being larger than an updated AA uncertainty region after successfully completing the BS process, continuing any ongoing AA processes.

8. The method of claim 2, further comprising, upon an unsuccessful completion of the BS process, restarting the BS process and continuing the FS and AA processes with existing FS buffer content.

9. The method of claim 2, further comprising, if an AA process successfully completes before completing the BS process, using a result of the completed AA process to start a track channel process on an acquired SV.

10. The method of claim 1, further comprising, if the FS process successfully completes before completing the BS process, saving a result of the completed FS process.

11. The method of claim 1, further comprising completing an unaligned acquisition (UA) process prior to starting the verification process and the BS process in parallel with the first SV.

12. A receiver, comprising:
a global navigation satellite system (GNSS) antenna configured to receive signals from a plurality of satellite vehicles (SVs), and
a processor configured to:
start a verification process and a bitsync (BS) process in parallel with a first SV among the plurality of SVs, and
upon completing the verification process while still performing the BS process, start a track channel process with the first SV based on an interim BS result obtained at the time of completing the verification process, and start a frame sync (FS) process with first SV based on the interim BS result.

13. The receiver of claim 12, wherein the processor is further configured to start an aligned acquisition (AA) process with a second SV among the plurality of SVs, upon completing the verification process, based on the interim BS result.

14. The receiver of claim 13, wherein the processor is further configured to:
upon successfully completing the BS process, compare a final BS value with the interim BS value, and
in response to a difference between the final BS value and the interim BS value being within a first threshold, not restart the track channel process and continue the FS process with existing FS buffer content.

15. The receiver of claim 13, wherein the processor is further configured to:
upon successfully completing the BS process, compare a final BS value with the interim BS value, and
in response to a difference between the final BS value and the interim BS value not being within a first threshold, restart the track channel process based on the final BS result.

16. The receiver of claim 13, wherein the processor is further configured to:
upon successfully completing the BS process, compare a final BS value with the interim BS value, and
in response to a difference between the final BS value and the interim BS value being greater than a second threshold or a remaining AA uncertainty region to be searched being larger than an updated AA uncertainty region after successfully completing the BS process, restart any ongoing AA processes.

17. The receiver of claim 13, wherein the processor is further configured to:
upon successfully completing the BS process, compare a final BS value with the interim BS value, and
in response to a difference between the final BS value and the interim BS value not being greater than a second threshold or a remaining AA uncertainty region to be searched not being larger than an updated AA uncertainty region after successfully completing the BS process, continue any ongoing AA processes.

18. The receiver of claim 13, wherein the processor is further configured to, upon an unsuccessful completion of the BS process, restart the BS process and continue the FS and AA processes with existing FS buffer content.

19. The receiver of claim 13, wherein the processor is further configured to, if an AA process successfully completes before completing the BS process, use a result of the completed AA process to start a track channel process on an acquired SV.

20. The receiver of claim 12, wherein the processor is further configured to, if the FS process successfully completes before completing the BS process, save a result of the completed FS process.

* * * * *